United States Patent
Negishi et al.

(10) Patent No.: US 7,677,366 B2
(45) Date of Patent: Mar. 16, 2010

(54) DISC BRAKE CALIPER AND MANUFACTURING METHOD OF DISC BRAKE CALIPER

(75) Inventors: Toshiyuki Negishi, Tokyo (JP); Hirobumi Niibori, Tokyo (JP); Masao Sugaya, Tokyo (JP); Takayuki Ichige, Tokyo (JP); Tetsuya Noguchi, Tokyo (JP); Tetsuya Ogawa, Saitama (JP)

(73) Assignees: Akebono Brake Industry Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 11/885,505

(22) PCT Filed: Mar. 3, 2006

(86) PCT No.: PCT/JP2006/304662

§ 371 (c)(1),
(2), (4) Date: Aug. 31, 2007

(87) PCT Pub. No.: WO2006/093344

PCT Pub. Date: Sep. 8, 2006

(65) Prior Publication Data

US 2008/0169162 A1 Jul. 17, 2008

(30) Foreign Application Priority Data

Mar. 3, 2005 (JP) ............................. 2005-058404

(51) Int. Cl.
*F16D 55/02* (2006.01)

(52) U.S. Cl. .................. 188/71.6; 188/73.1; 188/73.31
(58) Field of Classification Search ................ 188/71.6, 188/73.1, 73.31, 72.1, 71.1, 264 R
See application file for complete search history.

(56) References Cited

U.S. PATENT DOCUMENTS

| 3,503,475 | A | 3/1970 | Mione | |
|---|---|---|---|---|
| 4,290,510 | A | 9/1981 | Warren | |
| 2003/0010585 | A1* | 1/2003 | Okada et al. | 188/251 A |

FOREIGN PATENT DOCUMENTS

| EP | 0 289 399 | 11/1988 |
|---|---|---|
| EP | 1 079 135 | 2/2001 |
| FR | 2 693 246 | 1/1994 |
| JP | 61-45120 | 3/1986 |
| JP | 1-210628 | 8/1989 |
| JP | 5-27364 | 4/1993 |
| JP | 2001-107994 | 4/2001 |
| JP | 2003-28219 | 1/2003 |
| JP | 2006213964 A * | 8/2006 |

* cited by examiner

*Primary Examiner*—Melanie Torres
(74) *Attorney, Agent, or Firm*—Drinker Biddle & Reath LLP (57) ABSTRACT

After chemical nickel plating has been applied onto a rotor-side surface 10 of a caliper 5a made of aluminum alloy and an opposite surface 11 disposed in an opposite side of the rotor-side surface, nickel-tungsten alloy plating is applied onto these both surfaces 10, 11. Then, gold plating is applied onto only the rotor-side surface 10. As a result, a reflectance to incident light on the rotor-side surface 10 is made higher than a reflectance to incident light on the opposite surface 11.

9 Claims, 9 Drawing Sheets

DISC BRAKE CALIPER AND MANUFACTURING METHOD OF DISC BRAKE CALIPER

TECHNICAL FIELD

This invention relates to a disc brake caliper built in a disc brake used for braking a vehicle such as an automobile, and manufacturing method of the disc brake caliper.

BACKGROUND ART

In order to brake an automobile, a disc brake is widely used. In braking by the disc brake, a pair of pads arranged on both sides in an axial direction of a rotor that rotates together with a wheel are pressed on both sides of the rotor by a piston. As such the disc brake, disc brakes of various structures have been known. An opposed-piston type disc brake in which pistons are provided on both sides of a rotor in the opposed state to each other, can obtain stable braking power. Therefore, application of this opposed-piston type disc brake is increasing recently.

Figure 10:
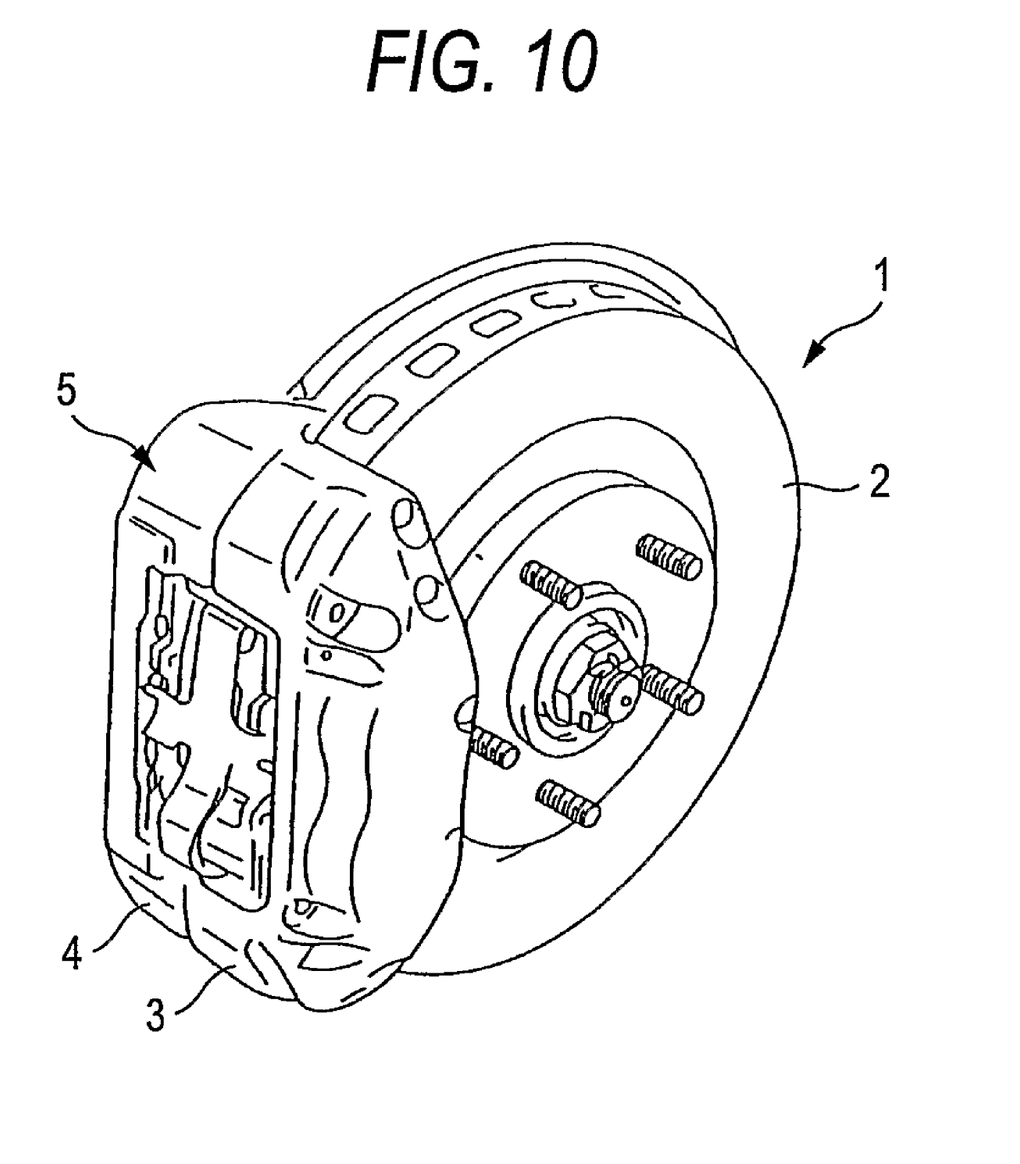
FIG. 10 is a perspective view showing an example of a conventional disk brake.

FIG. 10 shows such the opposed-piston type disc brake described in JP-U-05-027364. In an opposed-piston type disc brake 1, a caliper 5 composed of an outer body part 3 and an inner body part 4 is provided in a position where it interposes a rotor 2 between, and an outer cylinder and an inner cylinder are provided in these respective body parts 3 and 4 in a state where their respective opening parts are opposed to each other through the rotor 2. Into these outer cylinder and inner cylinder, an outer piston and an inner piston are fitted liquid-tightly and movably in the axial direction of the rotor 2. Further, in the outer body part 3, an outer pad is supported movably in the axial direction of the rotor 2; and in the inner body part 4, an inner pad is supported movably in the axial direction of the rotor 2. In the braking operation, pressure oil is fed into the outer cylinder and the inner cylinder, and the outer pad and the inner pad are pressed on both sides of the rotor 2 by the outer piston and the inner piston. In case of the structure described in JP-U-05-027364, the outer body part 3 and the inner body part 4 that are formed separately from each other are coupled by plural joint bolts thereby to form the caliper 5.

Further, in JP-A-2001-107994 and JP-A-01-210628, an opposed-piston type disc brake in which an outer body part and an inner body part that constitute a caliper are formed integrally is described. In the structure described in JP-A-2001-107994, the caliper is integrally formed by casting light alloy such as aluminum alloy, or alloy of iron family. In case that the assembly working efficiency of the opposed-piston type disc brake is taken into consideration, the structure in which the caliper is thus integrally formed does not require labor of coupling and fixing the outer and inner body parts to each other, compared with the conventional structure shown in FIG. 10.

The disc brake caliper is provided on a wheel side than a spring in a suspension system disposed between a vehicle body and the wheel. So, the disc brake constitutes a part of unsprung weight. Therefore, even small increase in weight of the disc brake has a large influence on driving performance centered at driving stability and fuel consumption. Therefore, from a viewpoint of improving the driving performance, it is preferable that the caliper is made of lightweight aluminum alloy. However, the caliper is easy to become high in temperature in the braking operation. Namely, in the braking operation, by the friction produced between the pad and the rotor, dynamic energy is converted into heat energy. This heat energy, for example, in the following forms, is transmitted to the caliper and brake oil.

(1) Conduction: Heat is transferred from the pad to the caliper coming into contact with the pad, or to the caliper and the brake oil through the piston.

(2) Radiation: Heat is transferred from the surfaces of the rotor and the pad to the caliper as an electromagnetic wave (radiation heat), increases the temperature of this caliper, and is transferred to the brake oil.

The heat energy is transmitted to the caliper and the brake oil in such the forms, so that the temperatures of these caliper and brake oil increase. Particularly, in case of the aluminum alloy caliper, this temperature increase becomes remarkable. For example, the temperature of caliper, in the braking operation, frequently exceeds 200° C. As this temperature increase of the caliper becomes remarkable, the temperature increase of the brake oil also becomes remarkable, which impedes occasionally good braking performance from being secured. Repeat of the remarkable temperature increase and decrease of the caliper causes the strength of this caliper to lower early.

In addition to the above Patent Documents, JP-A-2003-028219 also discloses related art.

The invention, in view of the above circumstances, aims at the heat transmission in the form (2) of the aforesaid forms (1) and (2), and has been made in order to reduce the temperature increase of a caliper and a brake oil due to heat generation produced by friction between a rotor and a pair of pads in a braking operation.

DISCLOSURE OF THE INVENTION

A disc brake caliper according to one or more embodiments of the present invention is provided in a disc brake that performs a braking operation by pressing a pair of pads on both sides of a rotor, and the disc brake caliper is used in a striding state over the rotor.

Particularly, in the disc brake caliper of one or more embodiments of the present invention, a reflectance to incident light on a rotor-side surface of the caliper is made higher than a reflectance to incident light on an opposite surface to the rotor-side surface.

In the specification and the claims, the "rotor-side surface of the caliper" means specifically a rotor-side surface of the caliper in using time, that is, a surface of the caliper on the side where the piston is arranged, and a surface continuing to the surface and facing to an inside in a diameter direction of the rotor. Further, the "opposite surface to the rotor-side surface (of the caliper)" means another surface than the "the rotor-side surface of the caliper", which is opposite to the rotor-side surface in the using time.

Figure 1:
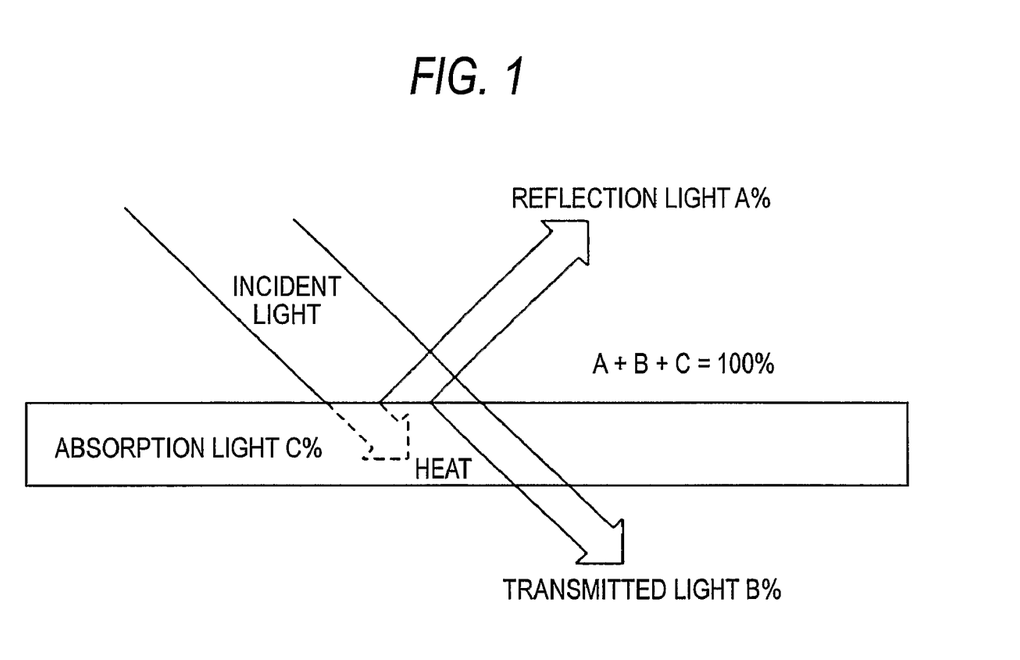
FIG. 1 is a diagram for explaining an advantage of the invention by means of a relation among a reflectance, a transmittance, and an absorptance of light to a substance.
Figure 2:
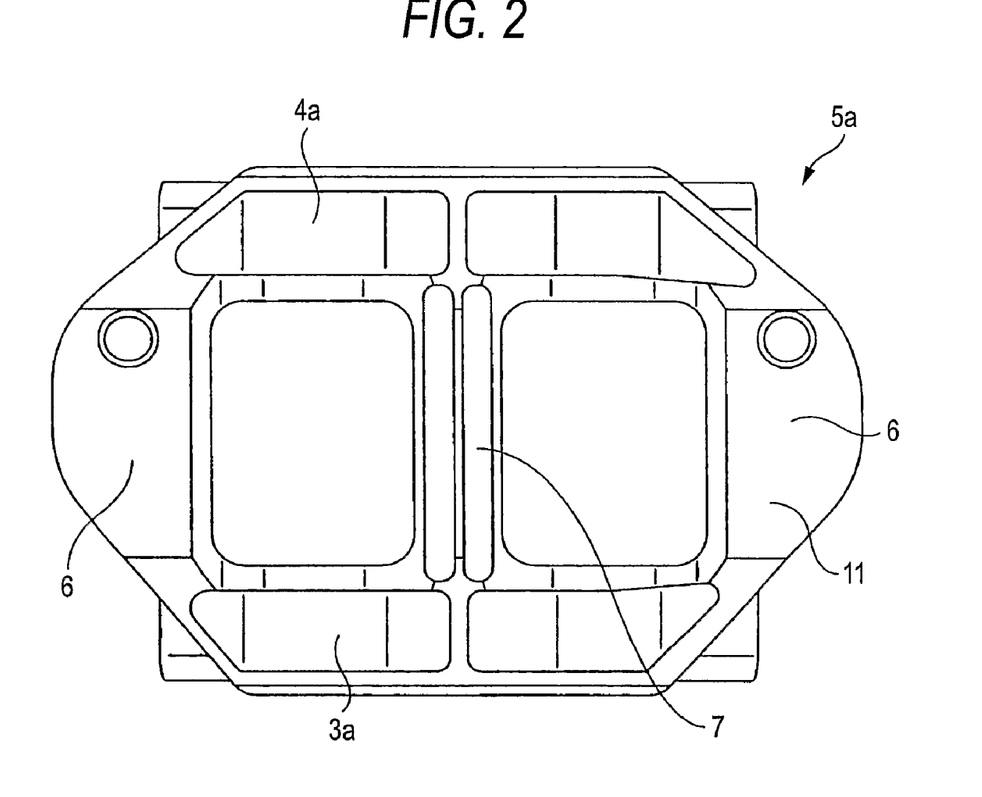
FIG. 2 is a diagram showing a caliper according to an exemplary embodiment of the invention, viewed from the outside in the diameter direction of a rotor in the using time.
Figure 3:
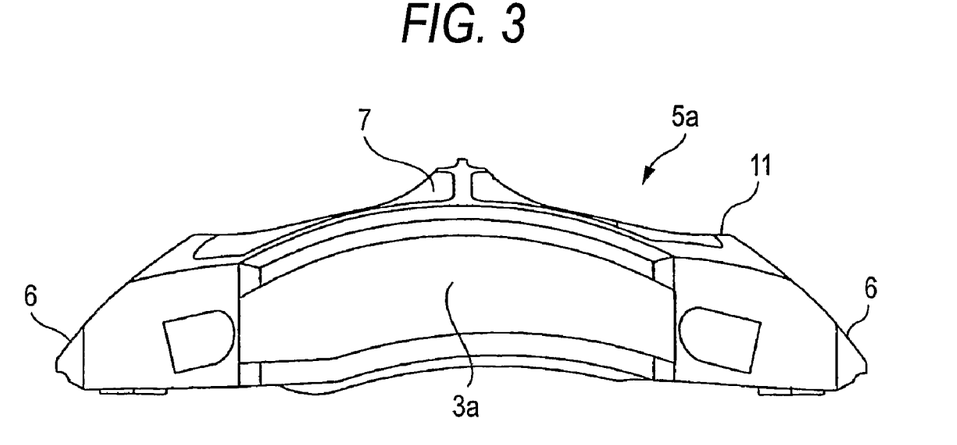
FIG. 3 is a diagram showing the caliper in FIG. 2, viewed from the downside.

In accordance with one or more embodiments of the present invention, since the reflectance to incident light on the rotor-side surface can be made high, and the reflectance to incident light on the opposite surface to the rotor-side surface can be made low, the temperature increase of the caliper and the brake oil can be sufficiently reduced. Namely, to the rotor-side surface of the caliper, since it is opposed to the rotor in the using time, the heat produced by friction between this rotor and the pads in braking time is easy to transmit as radiation heat. To the contrary, in case of the caliper of the invention, since the reflectance to the incident light on the rotor-side surface can be made high, the temperature increase of the caliper can be reduced. Namely, as shown in FIG. 1, in case that it is thought that light impinges on a substance, a relation of A+B+C=100 (%) is held, in which A % is a reflectance to incident light, B % is a transmittance to the same, and C % is an absorptance to the same. Therefore, in case that it is thought that the heat is transmitted to the caliper as radiation heat, in the invention in which the reflectance A on the rotor-side surface of the caliper can be made high, the absorptance C % and the transmittance B % can be held down, so that the temperature increase of the caliper due to the absorption of radiation heat from the rotor-side surface can be reduced.

On the other hand, since the opposite surface to the rotor-side surface of the caliper is not opposed to the rotor even in the using time, the radiation heat in the braking time is difficult to transmit to the opposite surface. Therefore, for the opposite surface to the rotor-side surface, it is not necessary to have the similar high reflectance to the reflectance of the rotor-side surface. Further, if the reflectance of the rotor-side surface is made the same as that of the opposite surface, the temperature increase of the caliper cannot be held down effectively. Namely, also in case that a reflectance to incident light on the opposite surface to the rotor-side surface is taken as A'%, a transmittance to the same is taken as B'%, and an absorptance to the same is taken as C'%, a relation of A'+B'+C'=100 (%) is held similarly to the case shown in FIG. 1. Therefore, if the reflectance A' on the opposite surface to the rotor-side surface can be made high similarly to the reflectance A on the rotor-side surface, the transmittance B' and the absorptance C' become low. It has been known that the degree of the absorptance C' of them becomes the same value as a value of an emissivity D' that is the degree of heat release which is released from a substance in case that the temperature of the substance comes to the predetermined temperature. Therefore, lowering of the absorptance C' causes lowering of the emissivity D', so that the temperature increase of the caliper cannot be held down effectively. Also in case of the rotor-side surface, the absorptance C becomes the same as an emissivity D. However, because of the rotor-side surface, making the absorptance C low is more effective than making this emissivity D high to hold down the temperature increase of the caliper. As described above, in case of the caliper of the invention, by making the reflectance on the opposite surface to the rotor-side surface of the caliper low, its emissivity can be made high, so that the degree in which the heat transmitted to this caliper is transmitted from the opposite surface to the rotor-side surface to the outside as the radiation heat can be increased. Therefore, according to the invention, the degree in which the radiation heat is absorbed from the surface of the caliper opposed to the rotor into the caliper can be increased, and the degree in which the heat transmitted to the caliper is transmitted from the opposite surface to the rotor-side surface of the caliper to the outside as the radiation heat can be increased. As a whole, the temperature increase of the caliper, and the temperature increase of the brake oil corresponding to the temperature change of this caliper can be reduced sufficiently. In result, thermal degradation of the caliper can be suppressed, and braking performance can be kept good.

Further, in accordance with one or more embodiments of the present invention, in the disc brake, the caliper may be made of aluminum alloy. When the caliper is made of aluminum alloy, the weight reduction of caliper can be carried out. Further, though the caliper is made of aluminum alloy that is high in heat transfer, the temperature increase of the caliper and the brake oil can be reduced sufficiently. Namely, when the caliper is made of aluminum alloy, the advantage of the invention in which the temperature increase of the caliper and brake oil can be sufficiently reduced, which is obtained by making the reflectance to the incident light on the back surface of the caliper higher than the reflectance to the incident light on the surface of the caliper, becomes more noticeable.

Further, in accordance with one or more embodiments of the present invention, after chemical nickel plating has been applied onto at least the rotor-side surface of the caliper, precious metal plating of any one of gold, silver, and copper is applied onto only the rotor-side surface.

Further, in accordance with one or more embodiments of the present invention, after chemical nickel plating has been applied onto the rotor-side surface of the caliper, before precious metal plating of any one of gold, silver, and copper is applied, nickel-tungsten alloy plating is applied onto at least the rotor-side surface.

By applying the nickel-tungsten alloy plating between the chemical nickel plating and the precious metal plating, the time necessary for plating formation can be shortened, which is different from the case in which after the chemical nickel plating has been applied, before the precious metal plating is applied, electrolytic nickel plating is applied. Further, the precious metal plating layer applied onto the rotor-side surface of the caliper can be kept stably good for a long period.

Namely, the surface of the member onto which the nickel-tungsten alloy plating has been applied is glossy, stable chemically, and difficult to deteriorate (superior in chemical resistance and heat resistance). Further, the nickel-tungsten alloy plating, by immersing a substance into electroless liquid of nickel tungsten alloy, is formed on the surface of this substance. Therefore, thickness (film thickness) of the plating layer can be uniformed comparatively with ease. Further, the nickel-tungsten alloy plating layer is easy to couple to the precious metal plating layer. Therefore, the precious metal plating layer formed onto the back surface of the caliper can be kept stably good for a long period.

On the other hand, conventionally, in case that gold plating is applied onto a member made of aluminum alloy, it has been thought that: after the chemical nickel plating has been applied, electrolytic nickel plating is applied, and next the gold plating is applied. However, in case that the electrolytic nickel plating is applied onto the caliper of the invention that has the complicated shape, it is difficult to uniform the film thickness of the plating layer (for example, the film thickness of the outer corner portion becomes thick more quickly than the film thickness of other portions). In result, not only the film thickness is not uniform, but also the time necessary for the plating formation becomes long because the thin portion must be thickened. To the contrary, according the one or more embodiments of the present invention, applying the nickel-tungsten alloy plating, by only immersing the caliper into the electroless liquid of nickel-tungsten alloy, is performed, so that the time necessary for the plating formation can be shortened. Further, according to the structure, the film thicknesses of all the plating layers can be nearly uniformed. Further, compared with the case where the electrolytic nickel plating is applied onto the caliper, surface hardness can be increased, and good rust-prevention and degradation resistance can be obtained. Further, the plating layer of nickel-tungsten alloy is easy to couple to the plating layer of precious metal such as the gold plating layer, and good in close attachment performance. Therefore, the good plating layer of precious metal can be stably kept for a long term.

Further, in case that the nickel-tungsten alloy plating is applied not only on the rotor-side surface of the caliper but also on the opposite surface of the rotor-side surface, the surface hardness of this opposite surface can be increased, and good rust-prevention and degradation resistance can be obtained.

Further, in one or more embodiments of the present invention, the precious metal plating applied onto the rotor-side surface of the caliper may be gold plating.

By the gold plating, color change due to oxidation is little in the caliper, and visually high-grade impression can be provided for the caliper.

Other aspects and advantages of the invention will be apparent from the following description and the appended claims.

BEST MODE FOR CARRYING OUT THE INVENTION

Detailed Description of the Exemplary Embodiments

Exemplary embodiments of the invention will be described with reference to the accompanying drawings.

FIGS. 2 to 8 show an exemplary embodiment of the invention. A disc brake caliper 5a in the embodiment is used in a state where it is arranged in a striding state over the periphery of a rotor 2 (refer to FIG. 10) rotating together with a wheel. This caliper 5a is integrally formed of aluminum alloy material such as an A6061 material. The caliper 5a includes an outer body part 3a and an inner body part 4a arranged on both sides in the axial direction of the rotor 2 (in the up-and-down direction in FIGS. 2 and 4, in the front and back direction in FIG. 3, in the obliquely up-and-down direction in FIG. 5, and in the obliquely right and left direction in FIG. 6), and a pair of coupling parts 6, 6 for coupling both end portions in the surrounding direction of these both body parts 3a and 4a (in the right and left direction in FIGS. 2 to 4, in the obliquely right and left direction in FIG. 5, and in the obliquely up-and-down direction in FIG. 6) to each other. Further, a reinforcement part 7 couples peripheral edge portions (front-side edge portions in FIG. 2, the upper edge portions in FIG. 3, and the back-side edge portions in FIGS. 4 to 6) in the intermediate portions in the surrounding direction of the both body parts 3a and 4a to each other.

Further, for each of the both body parts 3a and 4a, three outer or inner cylinders 8, 8 (9, 9) are provided (six cylinders are provided for the body parts in total), and into each of these cylinders 8, 8 (9, 9), an outer or inner piston (not shown) can be fitted. Since the basic structure of such the caliper 5a is similar to that of the known aluminum alloy caliper formed integrally, the more detailed description on the basic structure is omitted.

Particularly, in the embodiment, after chemical nickel plating has been applied onto a surface 10 (lower side surface in FIG. 7) on the rotor side of the caliper 5a that is the side opposed to the rotor 2 by an electroplating method, nickel-tungsten alloy plating is applied onto this rotor-side surface 10 by the electroless plating method. Next, plating of gold that is precious metal is applied onto the rotor-side surface 10 by an electroplating method. In result, on the rotor-side surface 10, as shown in FIG. 7, a nickel plating layer 13a (a chemical nickel plating layer 13a), a nickel-tungsten alloy plating layer 14a, and a gold plating layer 15 (a precious metal plating layer 15) are formed in this order from a base material 12 side.

Figure 4:
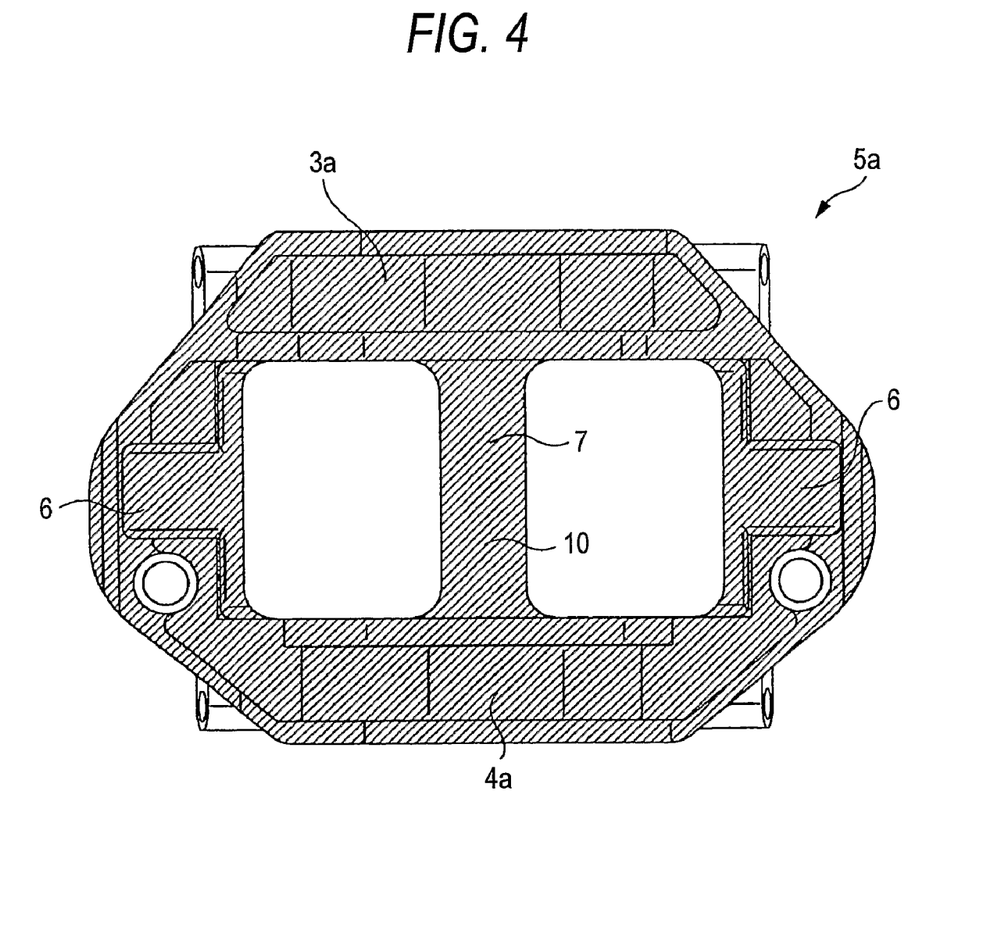
FIG. 4 is a diagram showing the caliper in FIG. 2, viewed from the backside.
Figure 5:
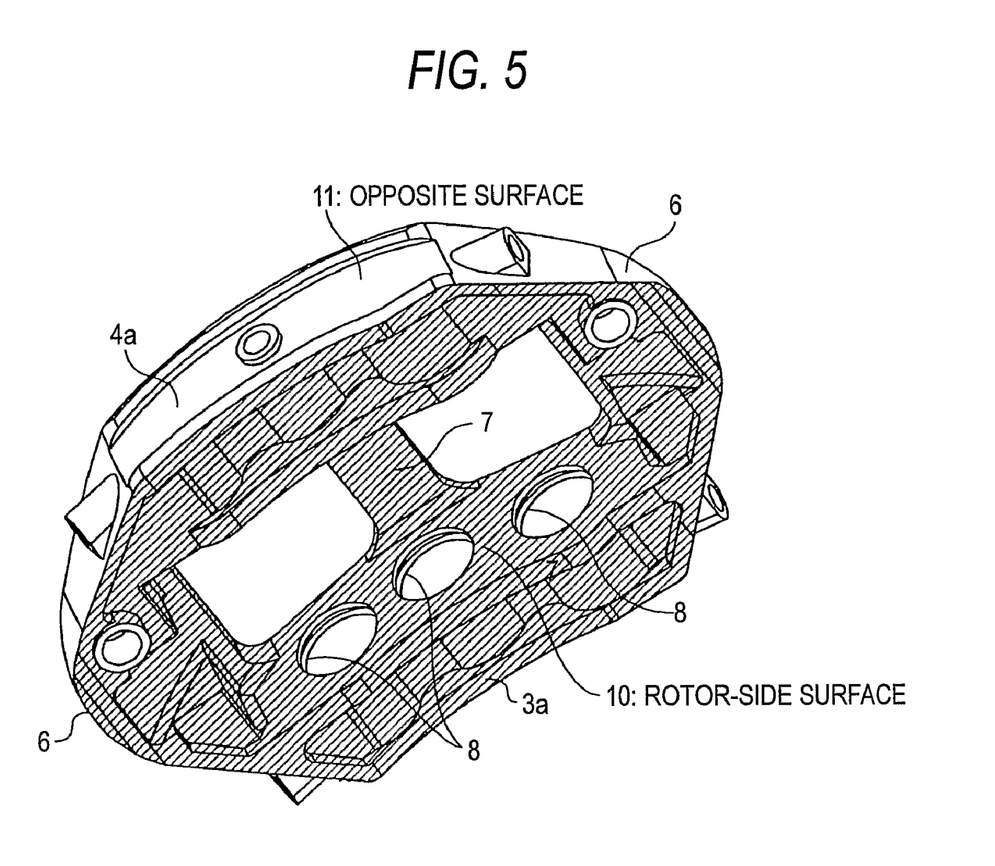
FIG. 5 is a perspective view of the caliper in the exemplary embodiment of the invention, viewed from the inside in the diameter direction of the rotor in the using time.
Figure 6:
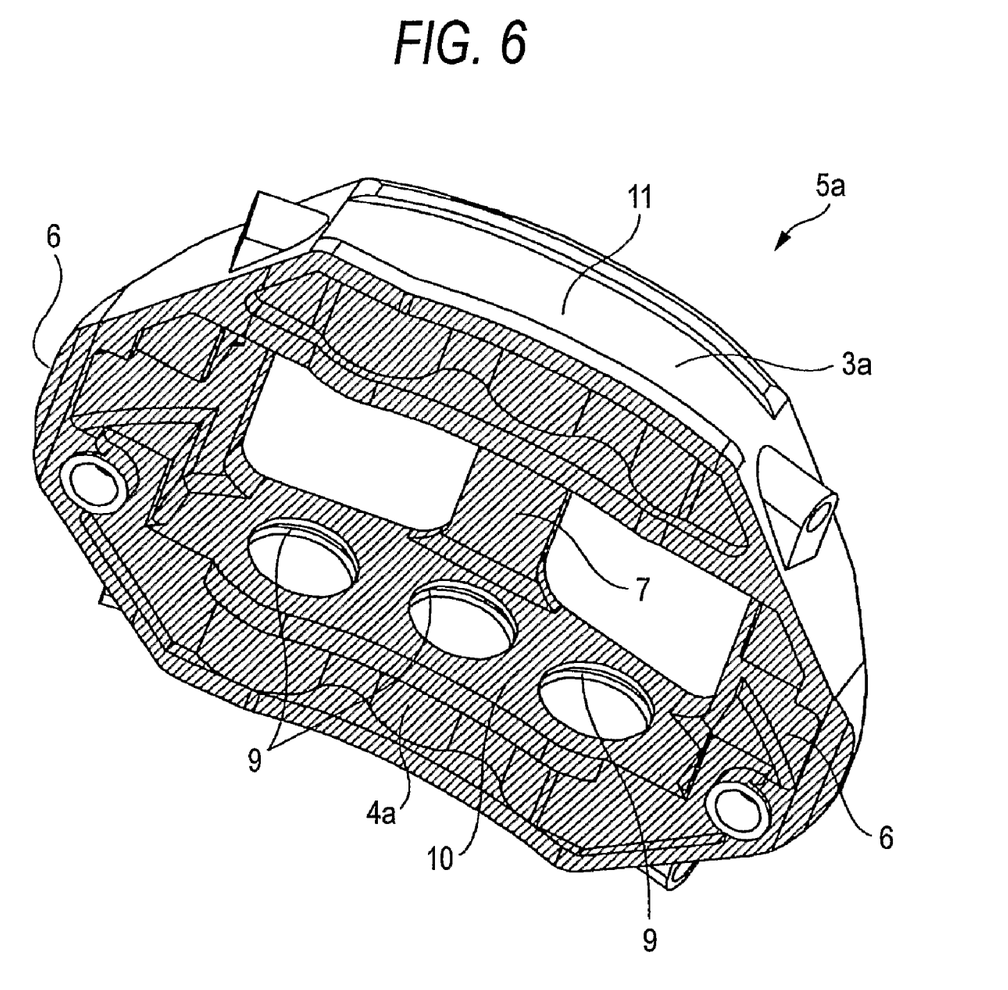
FIG. 6 is a perspective view of the caliper, viewed from another direction than the direction in FIG. 5.
Figure 7:
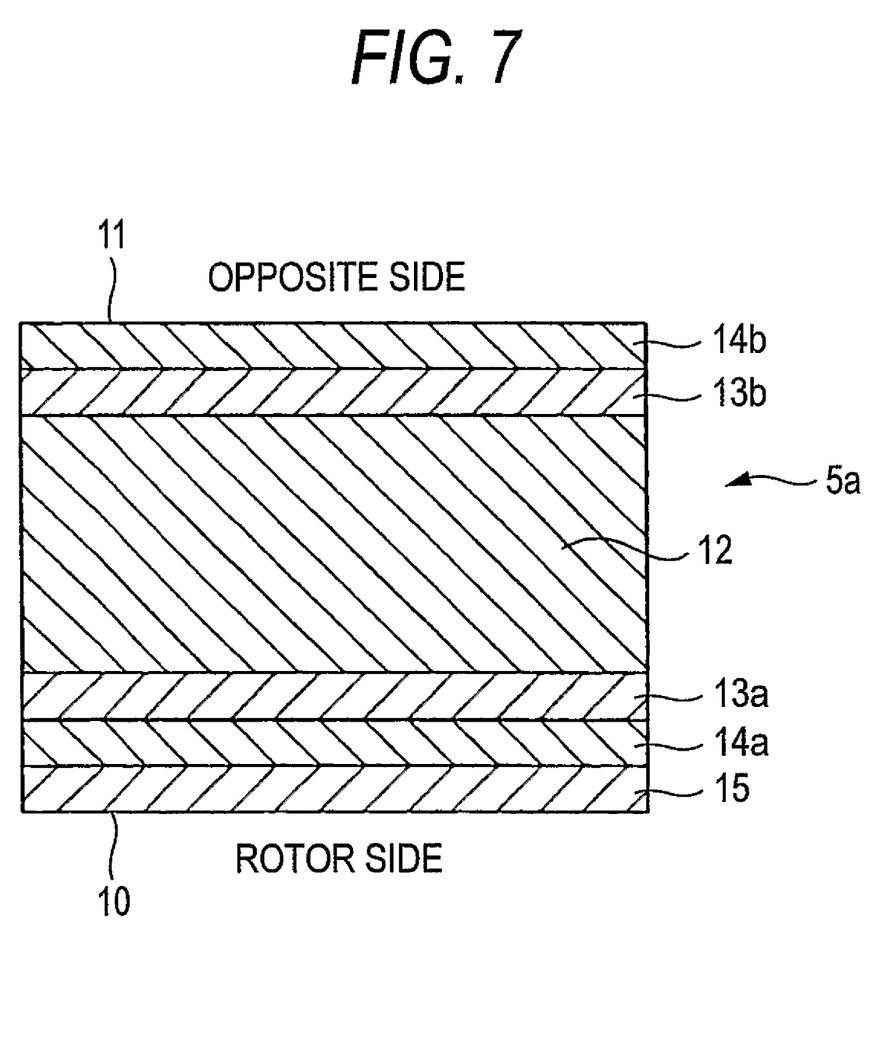
FIG. 7 is a schematic diagram showing a section of a part of the caliper in the exemplary embodiment.

On the other hand, on a surface 11 on the opposite side to the rotor-side of the caliper 5a, as shown in FIG. 7, similarly, by the chemical nickel plating and the nickel-tungsten alloy plating, a nickel plating layer 13b, and a nickel-tungsten alloy plating layer 14b are formed in this order from the base material 12 side. However, on the outer side of this nickel-tungsten alloy plating layer 14b, a gold plating layer is not formed. By this constitution, a reflectance to incident light on the rotor-side surface 10 of the caliper 5a is made higher than a reflectance to incident light on the opposite surface 11 to the rotor-side surface. In FIGS. 4 to 6, a portion shown by oblique lines represents a portion in which the gold plating layer 15 has been formed.

Figure 8:
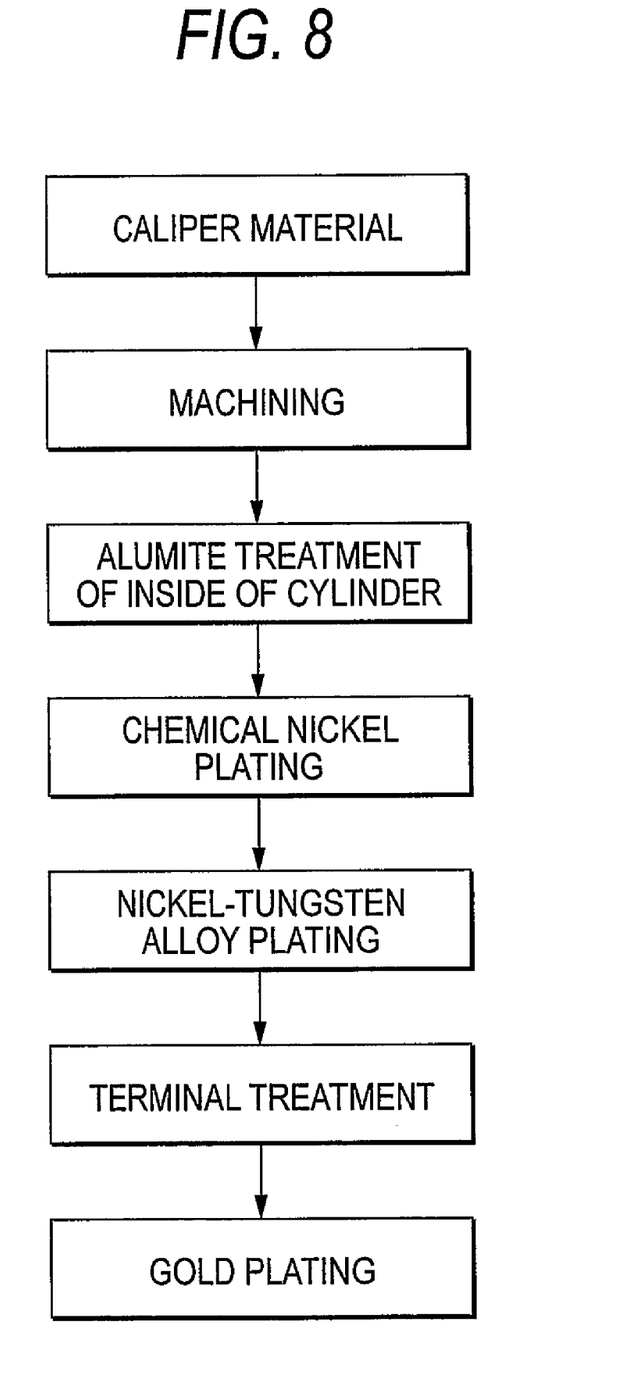
FIG. 8 is a flowchart showing a manufacturing process of the caliper in the exemplary embodiment.

Such the caliper 5a in the embodiment is manufactured by a process shown in FIG. 8. Firstly, a material made of aluminum alloy such as an A6061 material constituting the caliper 5a is prepared, and machining is performed for each part of this material to form each part of the caliper 5 into the predetermined shape. Next, alumite is applied to each cylinder 8, 8 (9, 9) which opens to the rotor-side surface 10 of this caliper 5a. In a state where the inside of each of these cylinders 8, 8 (9, 9) is masked, the chemical nickel plating is applied onto the whole surface (the rotor-side surface 10 and the opposite surface 11 to the rotor-side surface) of the caliper 5a. Next, in the state where the inside of each cylinder 8, 8 (9, 9) is masked, the nickel-tungsten alloy plating is applied onto the whole surface (the rotor-side surface 10 and the opposite surface 11 to the rotor-side surface) of the caliper 5a. In this time, composition of the nickel-tungsten alloy is not limited particularly. For example, the nickel-tungsten alloy including nickel of 90 w % and more, tungsten of 10 w % and less, and other components of 5 w % and less is used. Further, the film thickness of the nickel-tungsten alloy plating layer 14a, 14b is set to about 10 to 30 μm. Further, after the appropriate heat-treatment has been applied onto the caliper 5a, in a state where the opposite surface 11 to the rotor-side surface of the caliper 5a and the inside of each cylinder 8, 8 (9, 9) are masked, gold plating is applied onto the rotor-side surface 10 of this caliper 5a. The gold used in this gold plating is not limited particularly. For example, gold having purity of 99% and more is used, and the film thickness of the gold plating layer 15 is set to about 0.2 to 1.0 μm. Further, in masking, a tape of PTFE or silicon family is used. As the heat-treatment methods, heating methods by a vacuum melting furnace, an atmospheric furnace, a gas furnace, and a high-frequency induction heating apparatus can be adopted, and the kind of method is not limited particularly. Further, a heating speed, the time for which the temperature is kept constant, a cooling speed, and a heating state are not also limited particularly.

In case of the thus constructed disc brake caliper in the embodiment, a reflectance to incident light on the rotor-side surface 10 of the caliper 5a is made higher than a reflectance to incident light on the opposite surface 11 to the rotor-side surface. Therefore, the temperature increase of the caliper 5a and the brake oil can be sufficiently reduced. In result, the thermal degradation of the caliper 5a can be suppressed, and the braking performance can be kept good. Further, in case of the caliper in the embodiment, since the caliper 5a is made of the aluminum alloy, the weight of the caliper 5a can be reduced, and the advantage that the temperature increase of the caliper 5a and the brake oil can be sufficiently reduced, which is obtained by making the reflectance on the rotor-side surface 10 higher than the reflectance on the opposite surface 11 to the rotor-side surface, becomes more noticeable.

Further, in case of the caliper in the embodiment, after the chemical nickel plating has been applied onto the surface portion including the rotor-side surface 10 of the caliper 5a, the nickel-tungsten alloy plating is applied onto the surface portion including this rotor-side surface 10, and next, the gold plating is applied onto the rotor-side surface 10. Further, this gold plating is not applied on the opposite surface 11 to the rotor-side surface 10. Therefore, according to the embodiment, the time necessary for the plating formation can be shortened, which is different from the case in which after the chemical nickel plating has been applied, before the gold plating is applied, the electrolytic nickel plating is applied. Further, the gold plating layer 15 (FIG. 7) applied onto the rotor-side surface 10 can be kept stably good for a long period. Further, the film thicknesses of all the plating layers can be nearly uniformed. Further, compared with the case where the electrolytic nickel plating is applied onto the caliper 5a, surface hardness can be increased, and good rust-prevention and degradation resistance can be obtained. Further, since the gold plating is applied onto the rotor-side surface 10 of the caliper 5a, color change due to oxidation is little in the caliper 5a, and visually high-grade impression can be provided. Further, in case that after the chemical nickel plating has been applied onto the caliper, the electrolytic nickel plating is applied onto the caliper, the surface hardness becomes Hv 400 to 500, and rust is generated within 200 hours in a salt spray test by JIS Z4371. On the other hand, in the invention in which after the chemical nickel plating has been applied, the nickel-tungsten alloy plating is applied, it is known that the surface hardness can be increased to HV 650 to 750 and rust is not generated even 1000 hours later in the salt spray test.

In the exemplary embodiment, the gold plating is applied onto the rotor-side surface 10 of the caliper 5a. However, the invention is not limited to such the structure, but plating of silver or copper which is a kind of precious metal can be also applied in place of this gold plating. Namely, it is known that the reflectance of each metal in a wavelength (400 to 1000 nm) in an area of visible light to infrared radiation is as shown in the following Table 1:

TABLE 1

| Substance | Surface State | Reflectance |
|---|---|---|
| Aluminum | Polished-well surface | 0.943-0.961 |
| | Usually polished surface | 0.92-0.96 |
| | Rough surface | 0.945 |
| | Oxidation surface | 0.82-0.92 |
| Steel | Polished surface | 0.89-0.93 |
| | | 0.623-0.856 |
| | Oxidation surface | 0.21 |
| | Rough oxidation | 0.03-0.05 |

TABLE 1-continued

| Substance | Surface State | Reflectance |
|---|---|---|
| | surface | |
| Cast iron | Polished surface | 0.79 |
| | Oxidation surface | 0.25-0.42 |
| | Melting | 0.71 |
| Copper | Polished surface | 0.96-0.98 |
| Silver | Polished surface | 0.97-0.98 |
| Gold | Polished surface | 0.97-0.98 |
| Tungsten | Polished surface | 0.92-0.96 |
| Nickel | Polished surface | 0.90-0.95 |

As clear from this table 1, compared with aluminum, steel, cast iron, and tungsten, gold, silver, and copper can make the reflectance high. Therefore, in case that any one kind of plating, of gold, silver, and copper that are high in reflectance is applied onto only the rotor-side surface 10 of the caliper 5, the reflectance on the rotor-side surface 10 can be made higher than the reflectance on the opposite surface 11 to the rotor-side surface 10, so that the temperature increase of the caliper 5a and the brake oil can be reduced sufficiently.

Further, in the embodiment, also on the opposite surface 11 to the rotor-side surface of the caliper 5a, similarly to the case of the rotor-side surface 10, the nickel plating layer 13b and the nickel-tungsten alloy plating layer 14b are formed. However, as long as the reflectance on the rotor-side surface 10 can be made higher than the reflectance on the opposite surface 11 to the rotor-side surface 10, both of these plating layers 13b and 14b, or the nickel-tungsten alloy plating layer 14b can be omitted.

Figure 9:
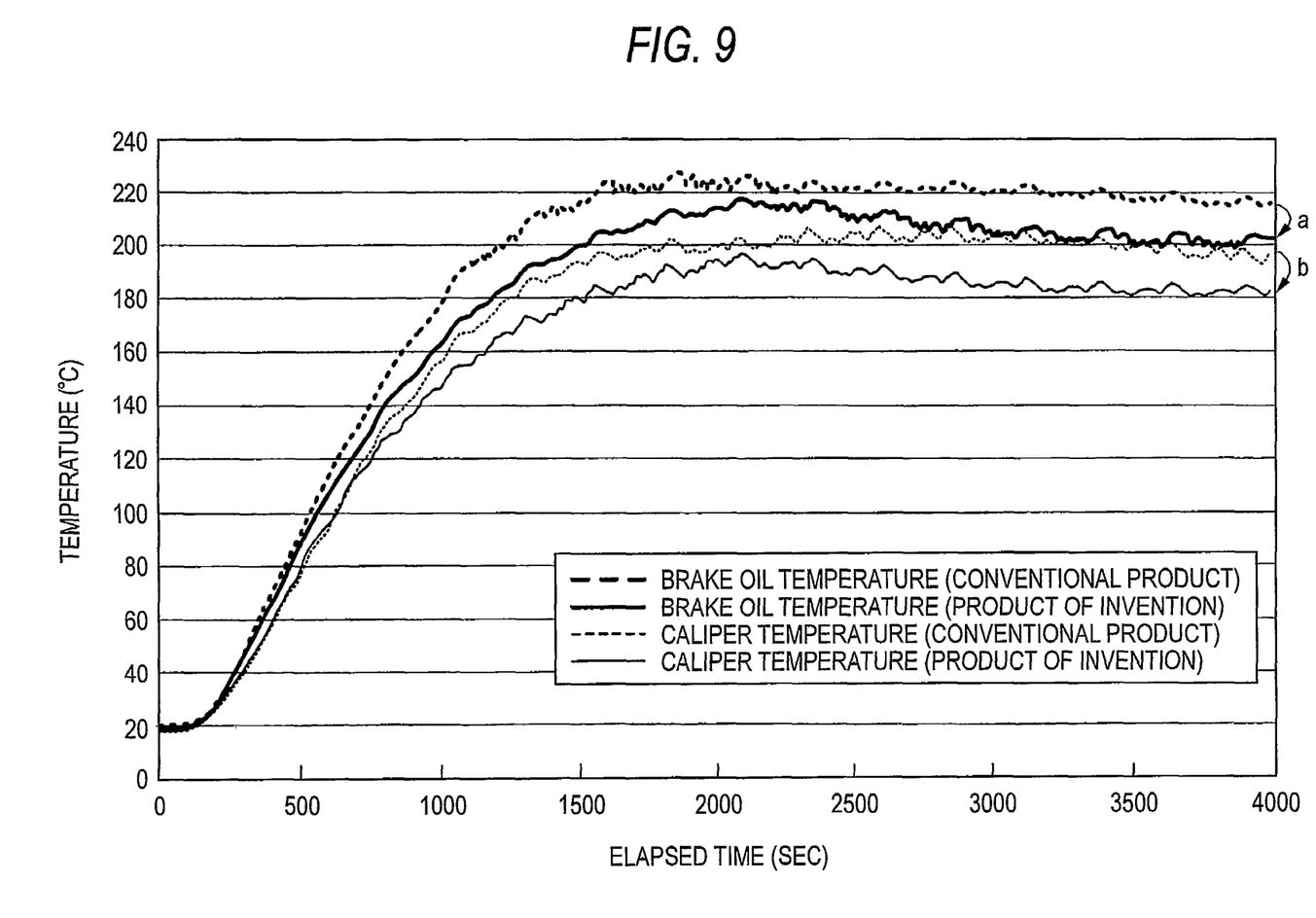
FIG. 9 is a diagram showing a result of a test performed in order to confirm an advantage of the invention in comparison on brake oil temperature and caliper temperature.

Next, a result of test performed in order to confirm the advantage of the embodiment will be described. In the test, there were used the caliper 5a made of aluminum alloy (caliper of the invention) having the structure of the embodiment, and the known caliper made of aluminum alloy (conventional caliper), which receives alumite treatment (hard anode oxidation coating) on the whole of its surface, and is out of a technical range of the invention. Using the caliper of the invention and the conventional caliper, a down-slope simulation test was performed by a dynamometer, and comparison on brake oil temperature and caliper temperature between the conventional caliper and the caliper of the invention was performed. A result of the thus performed test is shown in FIG. 9. The "down-slope simulation" means the test performed by the dynamometer on the assumption of the case where a vehicle is braked during going down a slope.

As clear from the test result shown in FIG. 9, in case of the caliper of the invention, compared with the case of the conventional caliper, the brake oil temperature can be decreased by about 15° C. (refer to an arrow "a") after a long time passed. Further, in case of the caliper of the invention, compared with the case of the conventional caliper, the caliper temperature can be decreased by about 18° C. (refer to an arrow "b") after a long time passed. From this test result, the advantage of the invention can be confirmed.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

The present application claims priority based on Japanese Patent Application No. P.2005-058404, filed on Mar. 3, 2005, the contents of which are incorporated herein by reference.

INDUSTRIAL APPLICABILITY

One or more embodiments of the present invention provide a disc brake caliper and a manufacturing method of the disc brake caliper, in which a temperature increase of a caliper and a brake oil due to heat generation produced by friction between a rotor and a pad in a braking operation can be sufficiently reduced.

The invention claimed is:

1. A disc brake caliper, for a disc brake that performs a braking operation by pressing a pair of pads on both sides of a rotor, the disc brake caliper is used in a striding state over the rotor, the disc brake caliper comprising:
   a rotor-side surface that facing to the rotor; and
   an opposite surface arranged in an opposite side of the rotor-side surface in the disc brake caliper,
   wherein the caliper is made of aluminum alloy, and
   wherein the rotor-side surface comprises a chemical nickel plating layer on the aluminum alloy and a precious metal plating layer applied on the chemical nickel plating layer.

2. The disc brake caliper according to claim 1, wherein a reflectance to incident light of the rotor-side surface is higher than a reflectance to incident light of the opposite surface.

3. The disc brake caliper according to claim 1, wherein the precious metal plating layer is made of one of gold, silver, and copper.

4. The disc brake caliper according to claim 3, wherein the precious metal plating layer is applied on only the rotor-side surface in the disc brake caliper.

5. The disc brake caliper according to claim 1, wherein the rotor-side surface further comprises a nickel-tungsten alloy plating layer between the chemical nickel plating layer and the precious metal plating layer.

6. The disc brake caliper according to claim 3, wherein the precious metal plating layer is a plating layer of gold.

7. A disc brake caliper manufacturing method, the disc brake caliper including rotor-side surface facing to a rotor, the method comprising:
   applying a chemical nickel plating layer on a base material of the disc brake caliper; and
   applying a precious metal plating layer on the chemical nickel plating layer, on only the rotor-side surface.

8. The method according to claim 7, wherein the precious metal plating layer is made of one of gold, silver, and copper.

9. The method according to claim 7, further comprising:
   applying a nickel-tungsten alloy plating layer on the chemical nickel plating layer,
   wherein the precious metal plating layer is applied on the nickel-tungsten alloy plating layer.

* * * * *